US012743400B2

(12) United States Patent
Agrawal et al.

(10) Patent No.: US 12,743,400 B2
(45) Date of Patent: Sep. 22, 2026

(54) CONTROL TRANSFER OF SHARED CONTENT

(71) Applicant: Dropbox, Inc., San Francisco, CA (US)

(72) Inventors: Abhishek Agrawal, San Francisco, CA (US); Rasmus Andersson, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 877 days.

(21) Appl. No.: 14/983,919

(22) Filed: Dec. 30, 2015

(65) Prior Publication Data

US 2017/0193001 A1 Jul. 6, 2017

(51) Int. Cl.

*G06F 16/178* (2019.01)
*G06F 3/04817* (2022.01)
*G06F 3/0482* (2013.01)
*G06F 3/04842* (2022.01)
*G06F 16/176* (2019.01)

(Continued)

(52) U.S. Cl.

CPC ........ *G06F 16/178* (2019.01); *G06F 3/04817* (2013.01); *G06F 3/0482* (2013.01); *G06F 3/04842* (2013.01); *G06F 16/176* (2019.01); *G06F 40/166* (2020.01); *G06Q 10/10* (2013.01); *G06Q 10/107* (2013.01)

(58) Field of Classification Search

None

See application file for complete search history.

(56) References Cited

U.S. PATENT DOCUMENTS 7,702,730 B2 4/2010 Spataro et al.
8,281,248 B2 10/2012 Kürpick et al.

(Continued)

FOREIGN PATENT DOCUMENTS

JP H08241280 A 9/1996
JP 2004265415 A 9/2004

(Continued)

OTHER PUBLICATIONS

Abolafya, Natan; Secure Documents Sharing System for Cloud Environments; DiVa; (Year: 2012).*

(Continued)

*Primary Examiner* — Ann J Lo
*Assistant Examiner* — Jermanine A Mincey
(74) *Attorney, Agent, or Firm* — Keller Preece PLLC

(57) ABSTRACT

An example computer implemented method to manage and transfer access to a synchronized content item across multiple users includes displaying a local version of the content item in an application window of a first application. The local version of the content item can be associated with a cloud version of the content item stored on a content management system. The method also includes displaying a content item control interface in the application window with the displayed content item. This content item control interface can be displayed by a second application responsible for synchronizing the local version of the content item with the cloud version of the content item and for managing content item controls through the content management system. The content item level control interface can include a (Continued)

content item editing permission interface that can allow a user to claim or release an editing permission to the content item.

23 Claims, 7 Drawing Sheets

(51) Int. Cl.
*G06F 40/166* (2020.01)
*G06Q 10/10* (2023.01)
*G06Q 10/107* (2023.01)

(56) References Cited

U.S. PATENT DOCUMENTS 8,768,966 B2* 7/2014 Yaniv .................. G06F 21/6227 707/786
9,374,328 B1* 6/2016 Kempen ............... H04L 51/043
9,575,981 B2* 2/2017 Dorman .................. H04L 67/06
9,602,514 B2* 3/2017 Narayanan .......... H04W 12/069
9,876,827 B2* 1/2018 Chew ..................... G06Q 10/10
10,530,854 B2* 1/2020 Savage ............... H04L 67/1095
2003/0105816 A1 6/2003 Goswami
2004/0088647 A1 5/2004 Miller et al.
2004/0230903 A1* 11/2004 Elza ...................... G06F 40/143 715/255
2005/0044165 A1* 2/2005 O'Farrell .............. G06F 16/273 709/213
2005/0289512 A1 12/2005 Matsusaka
2006/0253771 A1* 11/2006 Baschy ................. G06F 17/211 715/234
2006/0282784 A1 12/2006 Taylor et al.
2007/0185881 A1* 8/2007 Vienneau ............ G06F 16/2343
2008/0114720 A1 5/2008 Smith et al.
2008/0140732 A1* 6/2008 Wilson ................ G06F 16/1873
2008/0243847 A1* 10/2008 Rasmussen ......... G06F 16/1774
2009/0016247 A1 1/2009 Sood
2009/0106247 A1* 4/2009 Daughtry .............. G06F 21/604
2012/0166799 A1* 6/2012 Shamsaasef ............ G06F 21/10 713/168
2013/0006919 A1 1/2013 Shaver et al.
2013/0246901 A1 9/2013 Massand
2013/0254699 A1 9/2013 Bashir et al.
2014/0172799 A1 6/2014 Dorman
2014/0282078 A1 9/2014 Taylor et al.
2014/0304618 A1 10/2014 Carriero et al.
2014/0337291 A1* 11/2014 Dorman ................ G06F 16/162 707/634
2016/0065672 A1 3/2016 Savage et al.
2017/0149906 A1* 5/2017 DeMaris ............... H04L 67/142

FOREIGN PATENT DOCUMENTS

JP 2006011936 A 1/2006
JP 2006260478 A 9/2006
WO 2012/092025 A2 7/2012

OTHER PUBLICATIONS

Per Cederqvist et al., "Version Management with CVS", 2006, XP055308565, Retrieved from the Internet: URL: http://jakarta.apache.uasw.edu/pub/gnu/pub/non-gnu/cvs/source/nightly-snapshots/feature/cederqvist-1.12.13.1.pdf [retrieved on Oct. 7, 2016] chapter 10.
PCT Search Report and Written Opinion mailed Oct. 19, 2016 in related PCT Application No. PCT/US2016/047424, filed Aug. 17, 2016, titled, "Control Transfer of Shared Content" to Dropbox, Inc., 13 pages.
Examination Report No. 2 for Australian Application No. 2016382444, mailed on Jul. 25, 2019, 3 pages.
Notice of Reasons for Refusal for Japanese Application No. 2018-503185 mailed on Aug. 5, 2019, 9 pages.
Office Action for European Application No. 16760253.1 mailed on Aug. 19, 2019, 10 pages.
Extended European Search Report for European Application No. 20178293.5 dated Jul. 20, 2020, 10 pages.
Noue et al., "A Method of Synchronizing Disconnected Data in the Adaptive On-Line Storage System," Electronic Information and Communication Engineers, Sep. 13, 2002, 7 pages.
Notice of Reasons for Refusal for Japanese Application No. 2018-503185 mailed on Sep. 7, 2020, 10 pages.
Decision of Dismissal of Amendment for Japanese Application No. 2018-503185, mailed on Jan. 15, 2021, 7 pages.
Decision of Refusal for Japanese Application No. 2018-503185 mailed on Jan. 15, 2021, 4 pages.
Examination Report No. 1 for Australian Application No. 2020200220, mailed on Mar. 4, 2021, 5 pages.
Oda K., "Data Sharing Techniques Useful in the Office," PC Japan, Japan Softbank Creative Co., Ltd., Apr. 1, 2008, vol. 13, No. 4, pp. 76-83.
Examination Report No. 2 for Australian Application No. 2020200220, mailed on Aug. 23, 2021, 3 pages.
Examination Report No. 3 for Australian Application No. 2020200220, mailed on Nov. 9, 2021, 5 pages.
Examination Report No. 4 for Australian Application No. 2020200220, mailed on Mar. 1, 2022, 4 pages.
Campbell B., et al., "TortoiseCVS User's Guide," Version 1.9.14, XP055971168, Jan. 2006, 64 pages.
Communication pursuant to Article 94(3) EPC 20178293.5, mailed on Oct. 20, 2022, 10 pages,.
Examination Report No.1 for Australian Application No. 2022201538 mailed on Jul. 31, 2023, 4 pages.
Examination Report No.1 for Australian Application No. 2022201538 mailed on Feb. 10, 2023, 6 pages.
Examination Report No.3 for Australian Application No. 2022201538 mailed on Nov. 27, 2023, 4 pages.

* cited by examiner

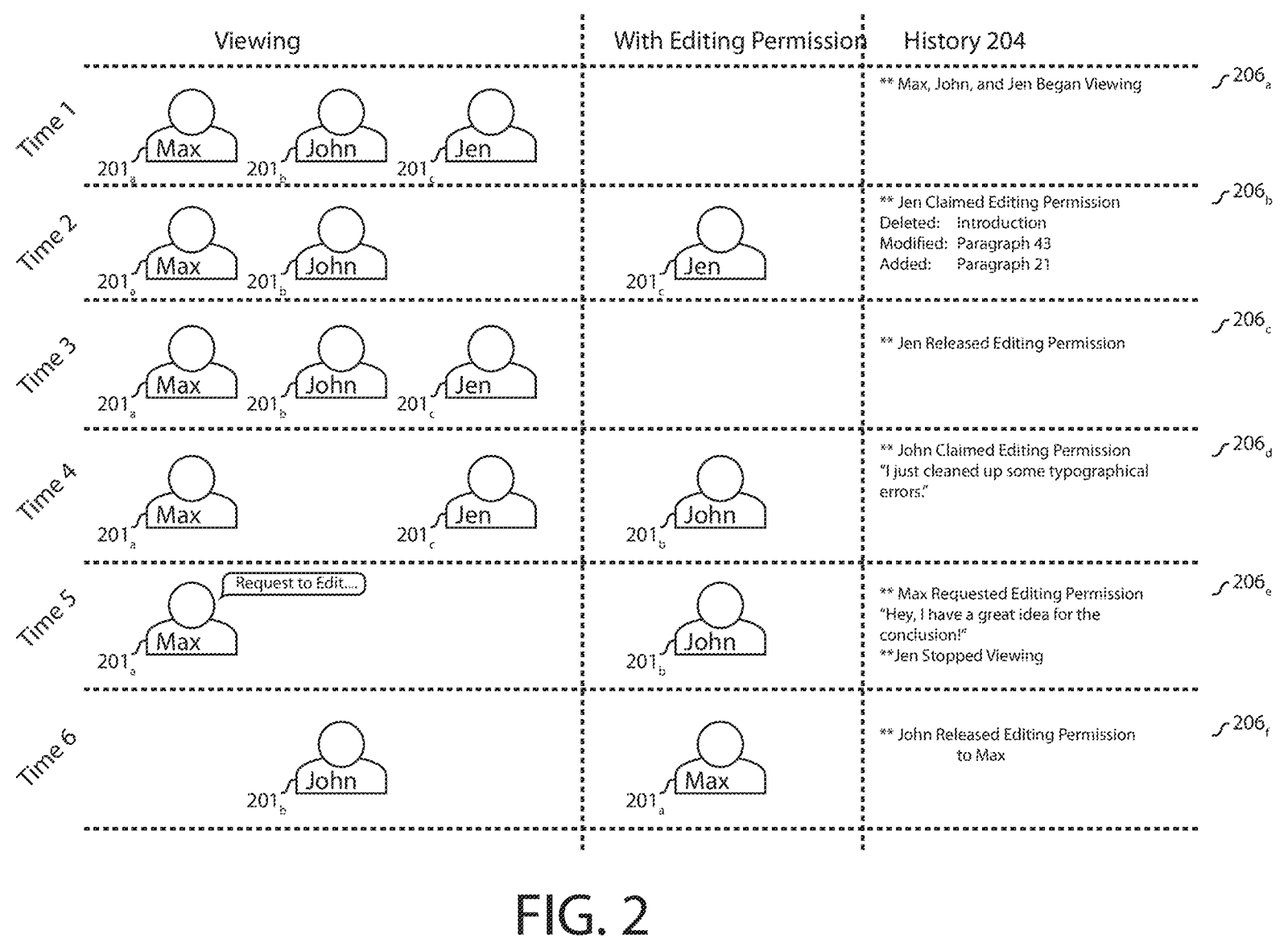

Viewing

With Editing Permission

History 204

Time 1

Max $201_a$ John $201_b$ Jen $201_c$

** Max, John, and Jen Began Viewing $206_a$

Time 2

Max $201_a$ John $201_b$

Jen $201_c$

** Jen Claimed Editing Permission
Deleted: Introduction
Modified: Paragraph 43
Added: Paragraph 21 $206_b$ Time 3

Max $201_a$ John $201_b$ Jen $201_c$

** Jen Released Editing Permission $206_c$

Time 4

Max $201_a$ Jen $201_c$

John $201_b$

** John Claimed Editing Permission
"I just cleaned up some typographical errors." $206_d$ Time 5

Request to Edit...

Max $201_a$

John $201_b$

** Max Requested Editing Permission
"Hey, I have a great idea for the conclusion!"
**Jen Stopped Viewing $206_e$ Time 6

John $201_b$

Max $201_a$

** John Released Editing Permission to Max $206_f$

FIG. 2

CONTROL TRANSFER OF SHARED CONTENT

BACKGROUND

Computer software such as word processors typically are unaware that a certain content item is actively synchronized with an online-synchronized content management system. This software might permit modifications to one synchronized copy of the content item while computer software running on another device also permits modifications to another synchronized copy of the content item. If the modifications to the two copies are simultaneous, it can result in a synchronization conflict. This typically occurs where a first user has access to a first copy of the content item and a second user has access to a second copy of the content item. If the first user edits the first copy and the second user edits the second copy before the edits made to the first copy can be synchronized, a conflict will result. Users sometimes try to overcome this limitation of existing word processors by communicating through other mediums such as email to pass off editing privileges—effectively creating an ad hoc workflow.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing and transferring access to a synchronized content item across multiple users.

An example computer implemented method to manage and transfer access to a synchronized content item across multiple users includes displaying a local version of the content item in an application window of a first application. The local version of the content item can be associated with a cloud version of the content item stored on a content management system and multiple users can have access to the content item stored in the shared collection. The method also includes displaying a content item control interface with the application window displaying the content item. This content item control interface can be displayed by a second application responsible for synchronizing the local version of the content item with the cloud version of the content item and for managing content item controls through the content management system. The content item control interface can allow a user to claim or release an editing permission to the content item. In some embodiments, the editing permission can only be claimed by one user of the plurality of users at a time.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2 shows an example timeline according to various embodiments;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for managing and transferring access to a synchronized content item across multiple users. For example, the disclosed technology can provide exclusive editing privileges for a synchronized content item such that only one user at a time can modify the content item. Should another user wish to edit the content item, the new user can request and receive the editing permissions from the first user. A content management system can manage the editing permissions to ensure that only one user at a time has the editing permissions.

Figure 1:
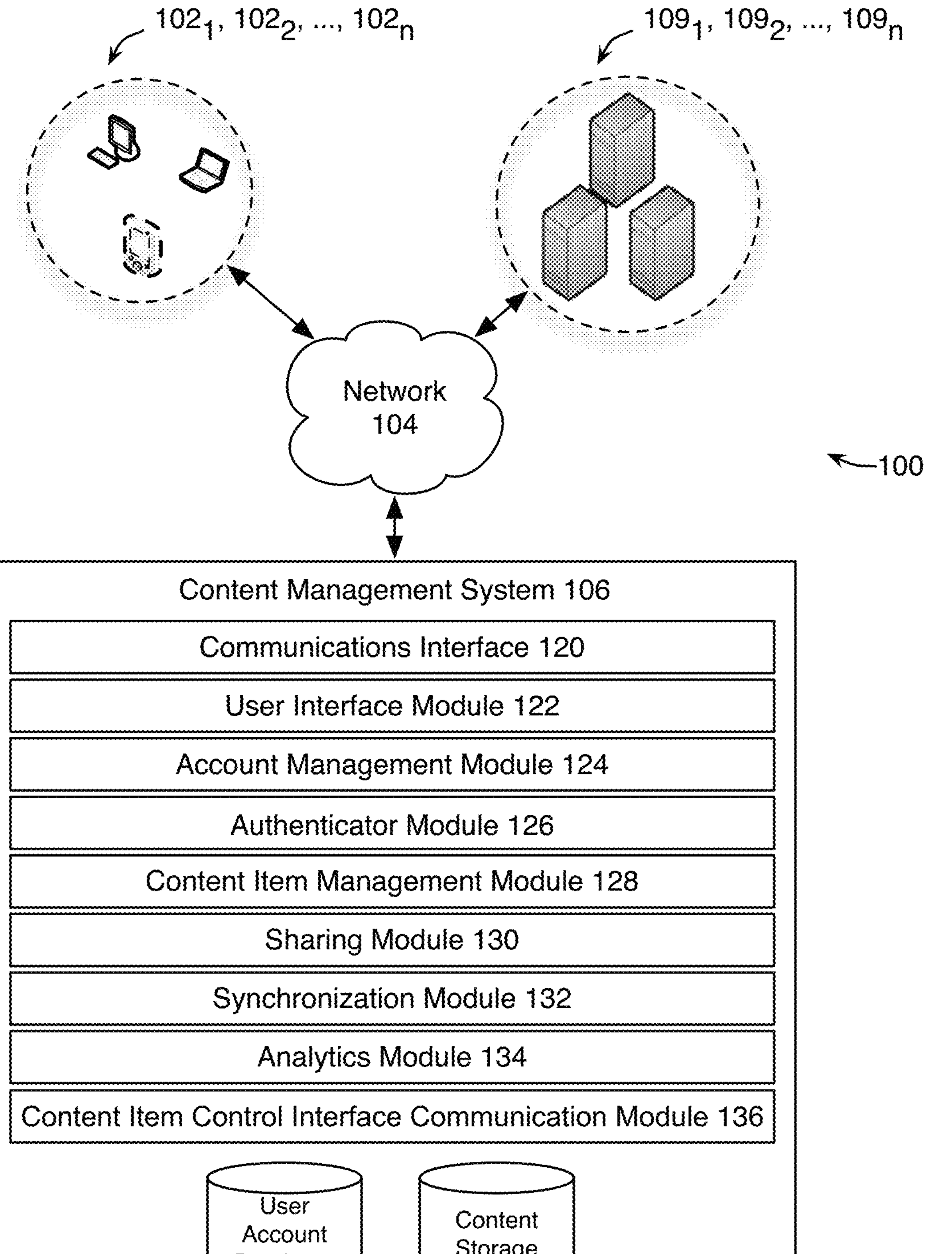
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $\mathbf{102}_1$, $\mathbf{102}_2$, . . . , $\mathbf{102}_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $\mathbf{102}_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $\mathbf{102}_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $\mathbf{102}_i$ can upload content to content management system 106 via network 104. Later, the same client device $\mathbf{102}_i$ or some other client device $\mathbf{102}_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $\mathbf{102}_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $\mathbf{102}_i$ can include client software, which synchronizes, via a synchronization module 132 at content management system 106, content in client device $\mathbf{102}_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $\mathbf{109}_1$, $\mathbf{109}_2$, . . . , $\mathbf{109}_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

Content management system 106 can include content item control interface communication module 136. This module can communicate with a content item control interface on client device 102. Content item control interface can provide information, controls, and other interactivity to a user specific to a content item. In some embodiments, content item control interface can be displayed with an application that has opened a content item such as a word processor. Examples of the functionality of content item control interface include reading and creating comments, transferring control of exclusive editing permissions for the related content item, displaying an indicator of what other users are currently viewing the content item, etc. Content item control interface communication module 136 can send and receive data to a content item control interface running client device 102 to enable such functionality. For example, content item control interface communication module 136 can receive comments, requests for the editing permissions, status updates (if a user is viewing the content item), etc. from one client device 102 associated with one user and send those comments, requests, and status updates, to another client device 102 associated with another user.

While content management system 106 is presented with specific components, it should be understood by one skilled in the art, that the architectural configuration of system 106 is simply one possible configuration and that other configurations with more or fewer components are possible.

Content management system 106 can, in some embodiments, coordinate the actions of multiple users regarding a content item. This can enable users to collaborate on a content item using comments, viewing indicators (showing what users are currently viewing the content item), sharing modifications (one user's changes to their copy of the content item can be reflected in another user's copy of the content item), shared content item history, etc. Another collaboration technique is using control transfer of exclusive editing permissions as described herein.

FIG. 2 shows an example timeline according to various embodiments of the present technology. In FIG. 2, users 201$_a$ ("Max"), 201$_b$ ("John"), and 201$_c$ ("Jen") (collectively, "User 201") are interacting with a synchronized content item. Each user 201 can be interacting with a local copy of the synchronized content item. For example, user 201$_a$ can interact with a synchronized copy using a web-based interface while users 201$_b$ and user 201$_c$ can interact with other synchronized local copies using first applications on various electronic devices. A first application can include a text editor, a word processor, presentation creator, a content creation/modification program (e.g., for photo-manipulation, music production, video production, etc.), a web browser, a media viewer, or any other application that can view, modify, or create a content item.

History 204 can include history entries 206$_a$-206$_f$ (collectively, "history entry 206"). Each history entry 206 can include a description of file access activity (e.g., which user 201 has editing permissions, if a user has requested or released editing permissions, which users 201 are viewing the content item, which users have stopped viewing or editing the content item, etc.), editing activity (e.g., deletions, insertions, formatting changes, and other edits), commentary (e.g., summaries of editing activity, comments, suggestions, etc.), auto generated reports of the foregoing, etc.

At "Time 1" in the example timeline, user 201$_a$, 201$_b$, and 201$_c$ begin viewing the content item and no user 201 has editing permissions. History entry 206$_a$ can record that "Max, John, and Jen Began Viewing." In some embodiments, the first user 201 to access the content item can automatically receive editing permissions. For example, if user 201$_a$ is first to access the content item, he will receive editing permissions while the users 201 that join later will be given only editing permissions. Alternatively, all users can start with viewing permissions only.

At "Time 2" in the example timeline, user 201$_c$ claims and receives the editing permission. In some embodiments, having the editing permission means that modifications made to that user's copy of the synchronized content item will be accepted by content management system 106 (and will be synchronized to other users copies of the synchronized content item). In some embodiments, the editing permission is exclusive, where only the user that has claimed editing permission can edit a file until the editing permission has been released. Having exclusive editing privileges emulates the workflow that many organizations use; for example, one user 201 might make modifications and then hand the content item off to another user 201 for review. Having explicit and exclusive editing privileges lets the users 201 know who is currently responsible for the content item. This procedure of explicit and exclusive editing privileges can help develop a clean and easy to understand record of the content items development.

In some embodiments, a user that does not have editing permissions can make unsynchronized edits to their own local copy, but the modifications that made to their copy of the synchronized content item will not be accepted by content management system 106. For example, such a user 201 might be able to modify their copy of the content item using a first application; but when that copy is submitted to content management system 106 for synchronization, content management system 106 can reject the modified version. This can result in an unsynchronized copy of the content item, and there would then be two copies of the content item on that user's 201 device: a synchronized copy and an unsynchronized copy (the version that was modified by the user). In some embodiments, the synchronized copy of a content item on a user's client device can be called a local version of the content item and the version of the content item on content management system 106 can be called the cloud version of the content item.

In some embodiments, users that do not have the editing permissions can have a different version of the content item synchronized to their device. For example, they can be provided a "stub" of the content item that contains a notice that the content item is currently being edited by another user. Alternatively, the content item can contain text or formatting to indicate that another user has editing permissions.

In some embodiments, when a user opens a content item, the second application can prompt the user whether they want to open the content item normally or with editing permissions.

The modifications (e.g., edits) that user 201$_c$ makes can be stored in history entry 206$_b$. A second application can monitor the activity within the first application to detect changes that have been made and auto-populate history entry 206$_b$ with summaries of those changes (e.g., "Deleted: Introduction"). In some embodiments, user 201 can manually submit summaries of edits or modify auto-generated summaries.

At "Time 3" in the example timeline, user 201$_c$ ("Jen") released the editing permission, as recorded in history entry 206$_c$. Releasing the editing permission can occur when user 201$_c$ with the editing permission closes the file in the first application, disconnects from content management system

106 (e.g., a result of a network disconnection), is inactive for a predetermined period of time, passes the editing permission to another user 201, or otherwise gives up the editing permission. In some embodiments, a user 201 has authority to revoke the editing permission from another user 201. This can be useful if the user 201 with the editing permission has been idle or unresponsive and another user 201 needs to claim the editing permission.

At "Time 4" in the example timeline, user 201$_b$ ("John") claimed the editing permission and made various modifications which he summarized in history entry 206$_d$ ("I just cleaned up some typographical errors"). In some embodiments, there is a queue for users 201 to claim the editing permission. For example, user 201$_a$ and user 201$_b$ can both submit a claim for the editing permission awaiting user 201$_c$ to release the editing permission. If user 201$_b$ was before user 201$_a$ in claiming the permission, user 201$_b$ can receive the editing permission before user 201$_a$, whom will receive it once user 201$_b$ releases it. In some embodiments, such a queue can be a prioritized queue wherein a higher priority user can "jump in line" in front of a lower priority user.

Figures 3A, 3B:
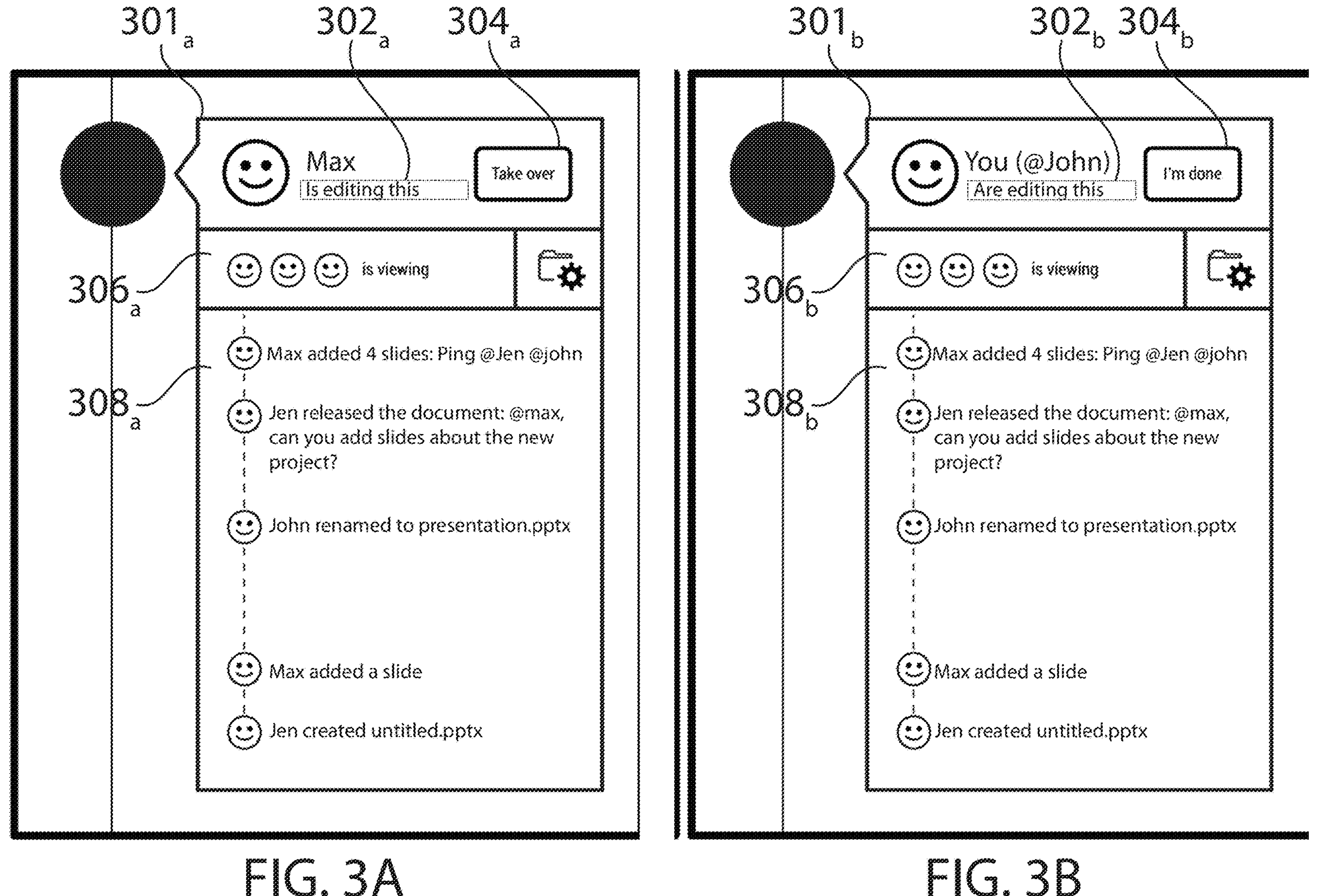
FIGS. 3A, 3B, 3C, and 3D show an example user interface according to various embodiments.
Figures 3C, 3D:
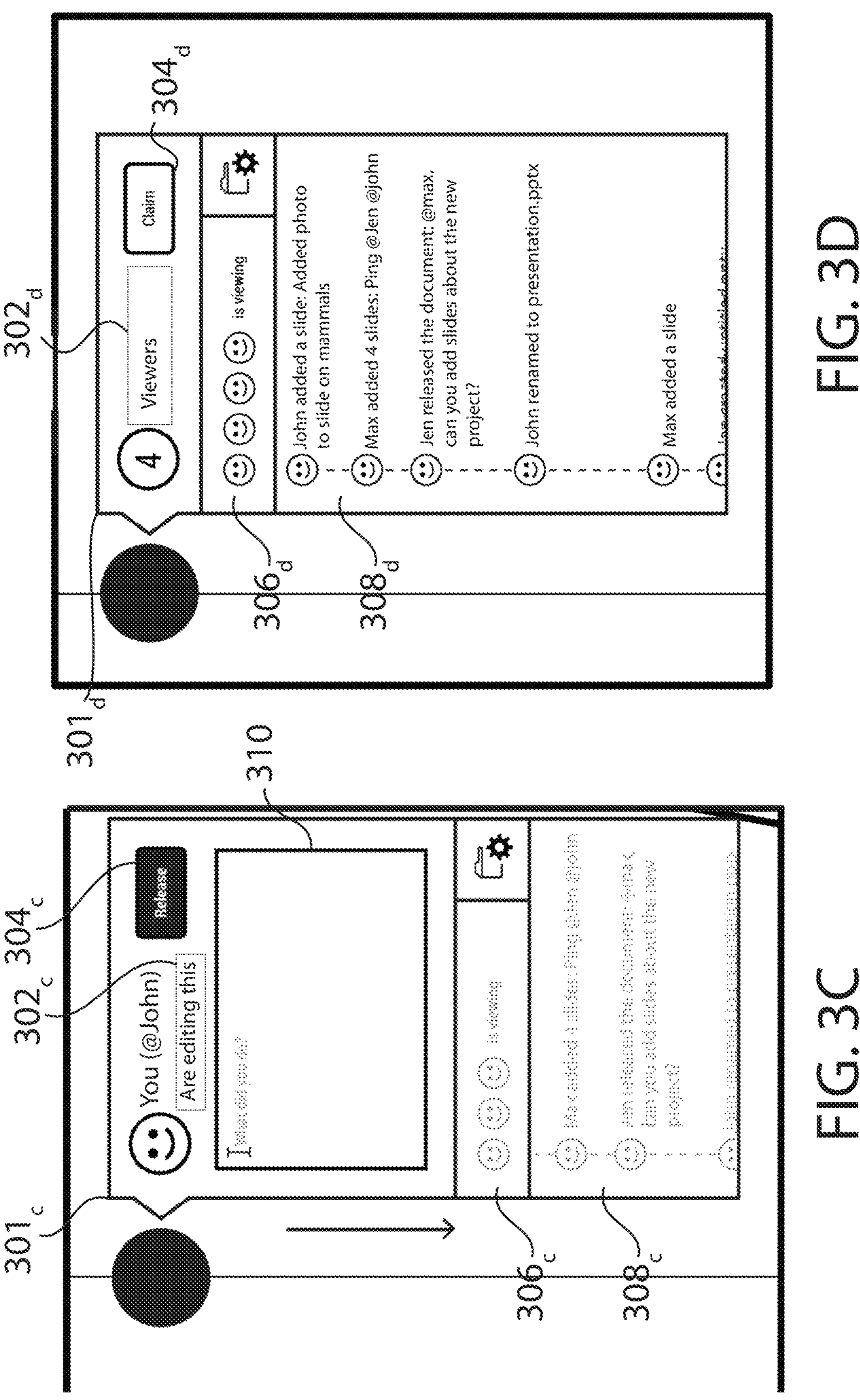

In some embodiments, user 201$_a$ can request the editing permission from the user 201$_b$ that currently has the editing permission as shown in "Time 5" in the example timeline. The requesting user 201 can also submit a comment explaining their request. In response to such a request, the user 201$_b$ that currently has editing permissions can directly release those permissions to the requesting user 201$_a$ as shown in "Time 6" of the example timeline. In some embodiments, a user can "ping" a user with editing permissions to nudge the user along or release the editing permissions. In some embodiments, this "pinging" can include contacting the user with editing permissions using a client electronic device via text message, email, phone call, etc, or through a notification in content item control interface 301 illustrated in FIG. 3.

FIGS. 3A, 3B, 3C, and 3D show an example user interface according to various embodiments. Content item control interface 301 (shown as content item control interface 301$_a$-301$_d$) can be created and managed by a second application. Content item control interface 301 can be an overlay to the first application and displayed with the first application. In some embodiments, content item control interface 301 is displayed within the first application window; alternatively, it can be shown partially within the first application window or fully outside of the first application window. In some embodiments, content item control interface 301 can contain status text 302$_a$-302$_d$ (collectively, "status text 302"), action button 304$_a$-403$_d$ (collectively, "action button 304"), view indicator 306$_a$-306$_d$ (collectively, "view indicator 306"), and history 308$_a$-308$_d$ (collectively, "history 308").

Status text 302 can reflect the current status of editing permissions of the content item. For example, in content item control interface 301$_a$ Max is "currently editing this" (status text 302$_a$) while in content item control interface 301$_b$, "You" "are currently editing this" (status text 302$_b$) and in content item control interface 301$_d$ status text 302$_d$ shows that there are four viewers (and no one working on it). When status text 302 describes that a user is "editing" the item, this can mean that the user has the editing permissions. Status text 302 can be manually populated or automatically generated.

Action button 304 can dynamically change to reflect various actions that can be performed by the user according to the status of the content item. For example, while Max is editing the content item, the user (John) is presented with action button 304$_a$ "Take Over." If the user activates action button 304$_a$, a request can be sent to Max requesting that Max release editing permissions to the user. When the user has the editing permissions, the user can press action button 304$_b$ to show that the user is done with their modifications and is ready to release editing permissions. After activating action button 304$_b$, content item control interface 301$_c$ can show comment section 310. The user can, after filling in comment section 310, activate action 304$_c$ to release the content item (e.g., release editing permissions).

In some embodiments, a user can fill in comment section 310 with a description of the modifications that the user did to the content item while it was under the user's control. In some embodiments, the second application can auto populate comment section 310 with summaries of edits made. In some embodiments, a user can modify the auto-populated summaries in comment section 310. Comment section can include text, links, multi-media, etc. When the user presses action button 304$_c$, comment section 310 can be added to history 308 as a history entry.

View indicator 306 can represent how many people are currently viewing the content item. "Viewing" can mean having the content item open in a first application, even though the user does not have editing permissions. In some embodiments, updates made by the user that currently has editing permissions can be automatically synchronized to the viewing users so that those updates are reflected in the first applications of the viewing users. Alternatively, the second application of a viewing user can update the content item to a synchronized version and receive an instruction to refresh the presentation in the first application to reflect the changes.

History 308 can reflect edits that have been made, changes in editing permissions, comments, etc. In some embodiments, content management system 106 stores an archive copy of the synchronized content item for every entry in history 308. This can enable a user to review the state of the content item at the time a modification was made.

Figure 4:
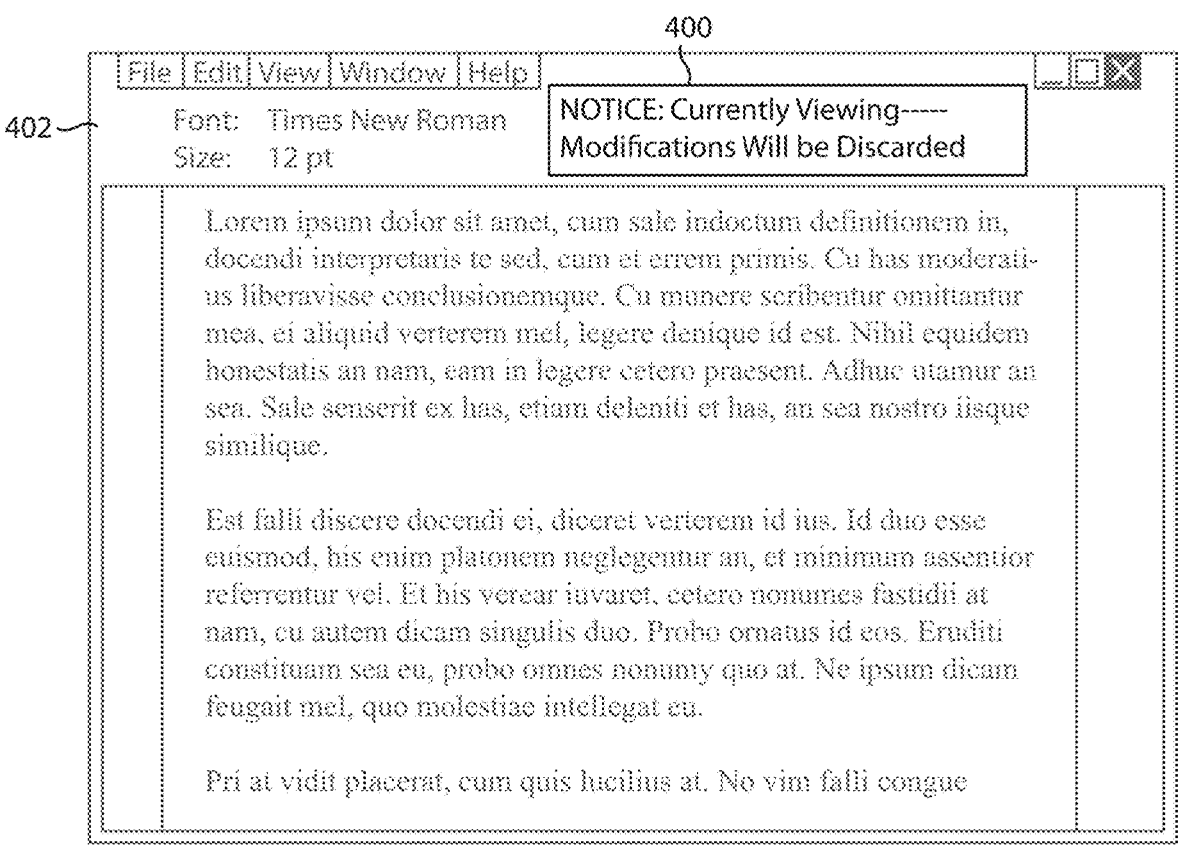
FIG. 4 shows an example editing permission notice according to various embodiments.

FIG. 4 shows an example editing permission notice 400 according to various embodiments. In some embodiments, the second application can create an overlay to be shown in or on first application 402. As described above, the first application can be a word processor. Editing permission notice 400 can warn a user that edits made within the first application will be discarded or will create duplicate versions. Editing permission notice 400 can inform a user that they currently have the editing permission or that they are able to claim the editing permission. Editing permission notice 400 can be part of the second application and/or content item control interface 301.

Figure 5:
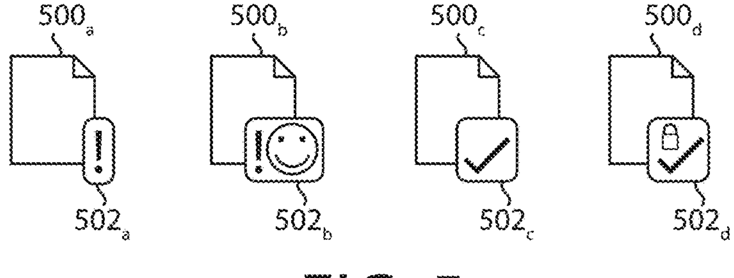
FIG. 5 shows various example permission indicators that can be overlaid on content item icons according to various embodiments.

FIG. 5 shows various example permission indicators 502$_a$-502$_d$ (collectively, "permission indicator 502") that can be overlaid on content item icons 500$_a$-500$_d$ (collectively, "content item icon 500") according to various embodiments. Permission indicator 502 can be displayed within a content item exploring application (such as a file explorer). For example, content item icon 500$_a$ can have permission indicator 502$_a$ to show that the user does not have editing permissions. For example, the user can attempt to modify the content item but such edits will not be synchronized with content management system 106; instead, the edits will result in a conflicted copy of the synchronized content item. Similar to permission indicator 502$_a$, permission indicator 502$_b$ can represent that the user does not have permission to edit the content item. Permission indicator 502$_b$ can also represent that another user currently has editing permissions. Permission indicator 502$_b$ can identify the other user by name, symbol, picture, etc. In some embodiments, when a user lacks editing permissions, the second application can modify the attributes of the content item. For example, the second application can modify the attributes to be "read only" or to have security settings such that only certain users (e.g., the user or users that currently have editing permissions) can modify and/or access the content item.

Permission indicators 502$_c$ and 502$_d$ can represent that the user has the ability to edit or claim editing permissions of the content item. For example, permission indicator 502$_c$ can represent that no other user has the editing permission of the content item and the content item is available. The user can then open the file and claim the editing permission. In some embodiments, opening such a content item automatically claims the editing permission. Permission indicator 502$_d$ can represent that the user currently possesses the editing permission and the content item is "locked" to other users.

Figure 6:
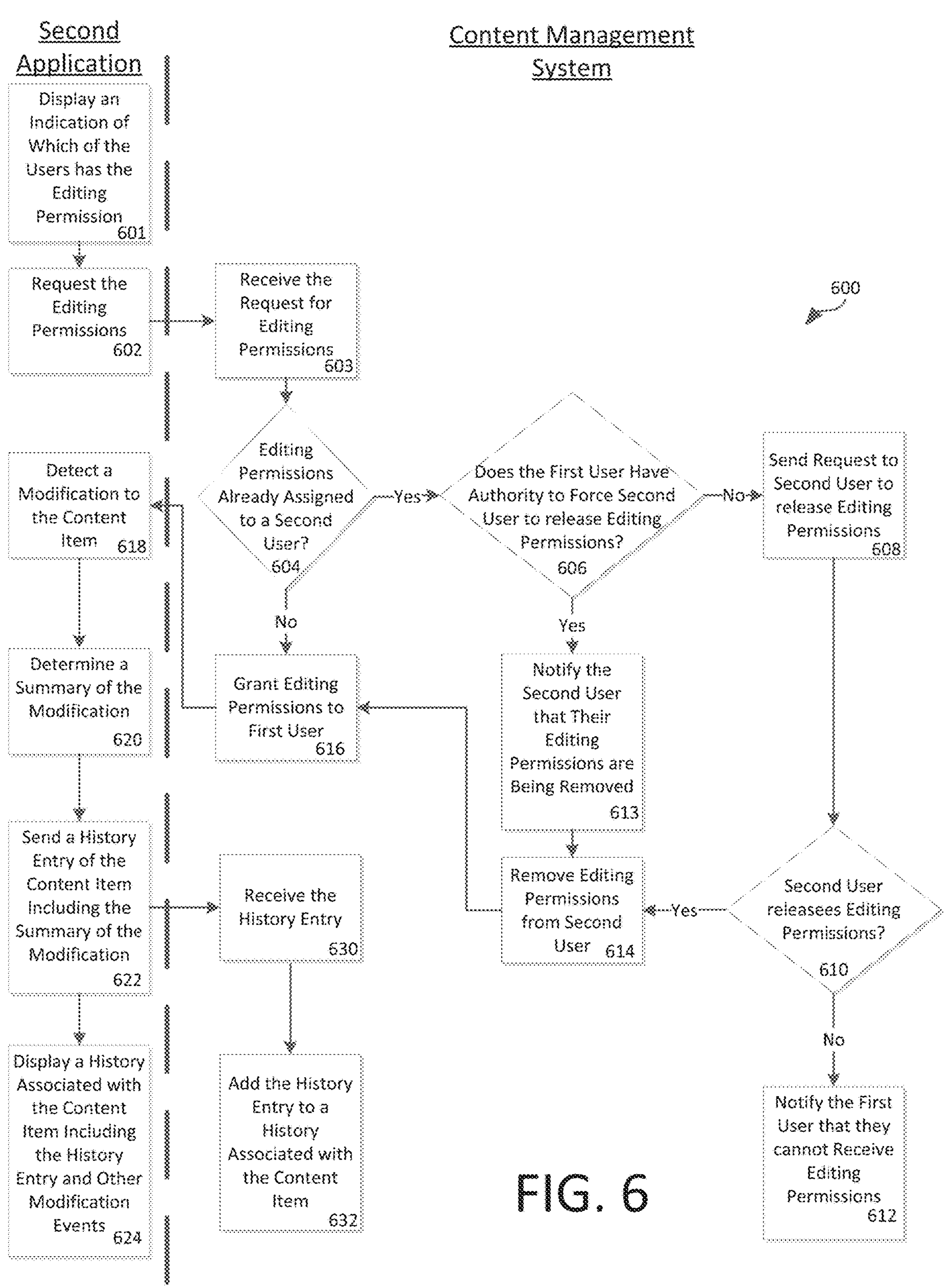
FIG. 6 shows an example process for coordinating the transfer of editing permissions.

FIG. 6 shows an example process 600 for coordinating the transfer of editing permissions between two users related to a content item. Process 600 can include various steps performed by a second application (e.g., on a client device 102) associated with a first user and content management system 106. Process 600 can begin by the second application displaying an indication of which of the users has the editing permission (step 601). For example, the second application can display status text 302 indicating that one of the users has the editing permissions. The second application can then request the editing permissions (step 602). For example, a user can select an option to claim or request the editing permissions and the second application can detect this selection. Content management system 106 can receive the request for editing permissions from the second application (step 603). Process 600 can then determine if the editing permissions are already assigned to a second user (step 604). This can include referencing a database or metadata in the content item. If the editing permissions have been already been assigned to a second user, the system can determine whether the first user has authority to force the second user to release the editing permissions (step 606). Different users can have different abilities regarding the distribution and management of permissions. For example, one user can force other users to accept, transfer, or release their permissions. In some embodiments, an interface can show which users are authorized to claim editing permissions. If the user does have authority to force the second user to release the permissions, the system can notify the second user that their editing permissions are being removed (step 613). This can include notifying the user via the second application (e.g., through permissions notice 400) or through other means such as email, text message, etc.

If the user does not have authority to force the second user to release the permissions, the system can send a request to the second user to release the editing permissions (step 608). This can include sending the request through the second application or through another application or notification means. For example, the second user might have editing permissions but is no longer at their computer; in such embodiments, content management system 106 can send a text message to the second user with the request. In some embodiments, the application for submitting the request is the same as the application for receiving the second user's response to the request. Alternatively, content management system 106 can receive a response via a different application or means (e.g., a notification is sent via text message, but the second user can respond via a web-based application).

If the second user does not release editing permissions, the system can notify the first user that they cannot receive the editing permissions (step 612). This can be accomplished through the second application. In some embodiments, the first user is only able to request editing permissions a limited number of times.

If the second user releases editing permissions at step 610 the system can remove the editing permissions from the second user (step 614). Step 613 can also lead into step 614. Removing the editing permissions from the second user can include sending an instruction to the second application to remove the editing permissions from the second user. This can include changing permissions notice 400 to indicate that the second user no longer has editing permissions. The second application can also change permissions indicator 502 to reflect the change. Removing editing permissions from the second user can also include modifying a permissions database and/or metadata for the content item to reflect the change in permissions for the second user.

After removing the editing permission for the second user, the system can then grant editing permissions to the first user (step 616). Granting editing permissions (step 616) can also result if the editing permissions are not assigned to a second user (step 604). Like revoking permissions from the second user, granting permissions can include sending instructions to the second application to grant permissions and change permissions indicator 502 and permissions notice 400. Granting permissions can include modifying a database entry or content item metadata on content management system 106 to indicate that the first user now has the editing permissions for the content item.

After receiving the editing permissions for the first user, the second application can detect a modification to the content item (step 618). This can include detecting an operating system alert (e.g., that the content item has changed in size or other properties to indicate that it has been modified), searching the content item in order to find changes (including creating a hash of the content item and comparing the newly created hash with a previous hash), or receiving a user selection indicating that the user has modified the content item. The second application can then determine a summary of the modification (step 620). For example, the second application can compare the modified version of the content item with a previous version of the content item and determine how the content item has changed (e.g., for a text document, which words were added or deleted). In some embodiments, step 620 includes processing the modifications for the summary; such processing can include: identifying the parts of the content item that were modified (e.g., the header, title, etc.), the depth of the modification (e.g., how many words were modified or how much of the content item is modified such as a percentage), the duration of the modification (e.g., how long the first user was modifying the content item), etc. In some embodiments, the first user can provide a summary of the modification or edit an auto-generated summary.

The second application can then send a history entry of the content item including the summary of the modification (step 622). The history entry can include the summary of the modification as well as a timestamp of when the history entry was finalized. For example, a first user can have multiple editing sessions while having the editing permissions. Each one of these sessions can be summarized according to step 620 and the history entry of step 622 can include a summary according to each of the sessions.

The second application can then display a history associated with the content item including the history entry and other modification events (step 624). For example, the history can include which users have had the editing permissions, history entries describing other users' modifications, and other details describing the evolution of the content item.

Content management system 106 can receive the history entry from the second application (step 630) and add the history entry to a history associated with the content item (step 632). The history described in step 632 can be similar to the history described in step 624. Any new users that synchronize the content item can then receive the history from content management system 106.

In some embodiments, content management system 106 can mediate communications between second applications running on various client devices 102 associated with various users. For example, if a user enters a comment into a second application on one client device 102, the client device 102 can send that comment to content management system 106 (e.g., content item control interface communication module 136) and content management system 106 can send the comment to a second client device 102. Another way in which content management system 106 can mediate the actions between users is if multiple users attempt to modify a content item at once. Applying the principles herein disclosed, in some embodiments, content management system 106 can accept only the modifications provided by the user that currently has the editing permissions. Modifications that are provided by users that do not have the editing permissions can be rejected (e.g., using synchronization module 132). Accepted modifications can then be synchronized, using synchronization module 132, to the other client devices 102 associated with the users that do not currently have editing permissions.

Figure 7A:
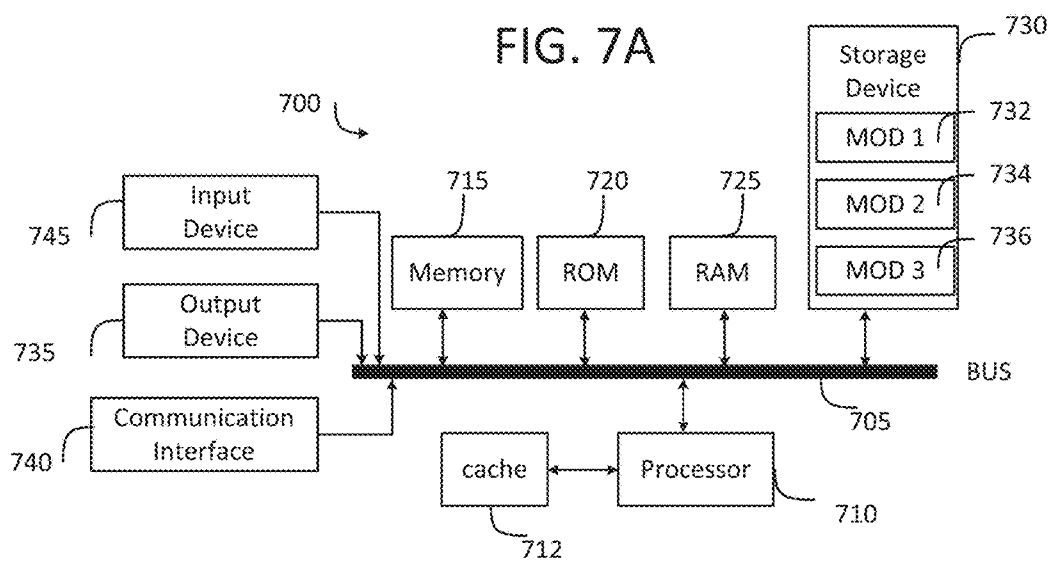
FIG. 7A shows an example possible system embodiment for implementing various embodiments of the present technology.
Figure 7B:
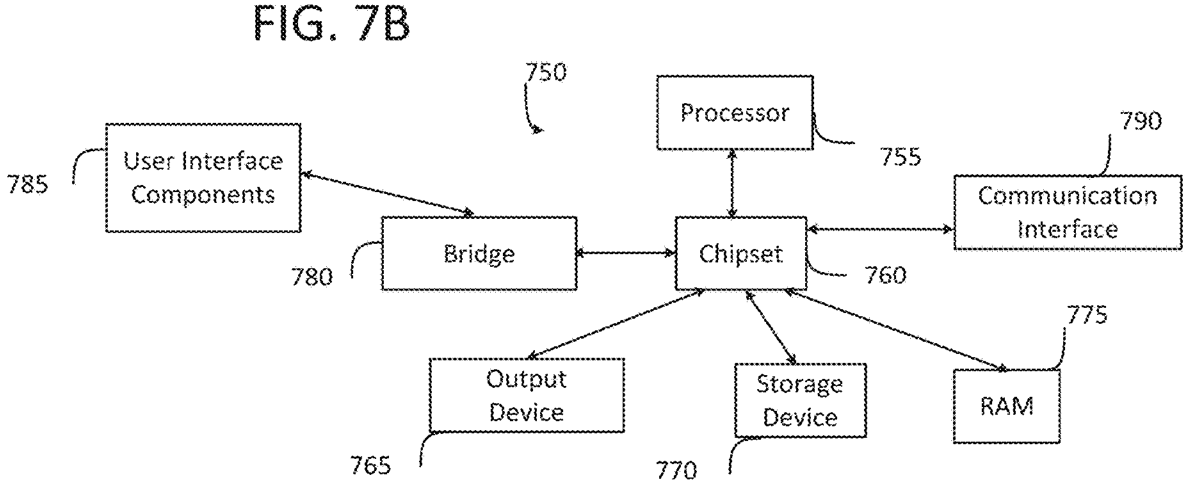
FIG. 7B shows an example possible system embodiment for implementing various embodiments of the present technology.

7A and FIG. 7B show example possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Example system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer-readable medium comprising computer-executable instructions stored thereon, the computer-executable instructions when executed by one or more processors, cause the one or more processors to:

receive, within a content item explorer interface, a user input from a first user account to open a local version of a content item in a native application;

cause display, by a client-side application on a client device associated with the first user account, of a content item control interface, the content item control interface displayed alongside the native application displaying the local version of the content item, wherein the client-side application synchronizes the local version with a remote version at a content management system, wherein the client-side application is a separate application from the native application, wherein the content item control interface is a window that displays metadata and controls dedicated to the content item displayed at the native application;

receive an indication, by the content item control interface of the client-side application, that the first user account has requested exclusive editing permission that is temporary to edit the content item;

determine, by the content item control interface, that the first user account made one or more first modifications to the local version of the content item at the native application; and synchronize, by the content item control interface, the one or more first modifications made to the local version of the content item with the remote version of the content item stored on the content management system and with other local versions of the content item stored on other client devices associated with a plurality of user accounts having access to the content item.

2. The non-transitory computer-readable medium of claim 1, storing computer-executable instructions which, when executed by the one or more processors, cause the one or more processors to:

in response to a user input requesting to open the local version of the content item, present a first option to open the local version of the content item with the exclusive editing permission and a second option to open the local version of the content item without the exclusive editing permission;

based on an input selecting the first option, send, by the client-side application to the content management system, a request for the first user account to claim the exclusive editing permission; and after an acceptance of the request claiming the exclusive editing permission, open the local version of the content item with the exclusive editing permission.

3. The non-transitory computer-readable medium of claim 1, storing computer-executable instructions which, when executed by the one or more processors, cause the one or more processors to:

receive a user input in the content item control interface, the user input releasing the exclusive editing permission for the content item; and send, by the client-side application, a communication to the content management system, the communication indicating that the first user account has released the exclusive editing permission, whereby the content management system is configured to allow any of the plurality of user accounts having access to the content item to claim the exclusive editing permission for the content item after the release of the exclusive editing permission.

4. The non-transitory computer-readable medium of claim 1, storing computer-executable instructions which, when executed by the one or more processors, cause the one or more processors to:

send, by the client-side application, a history entry to the content management system for inclusion in a history of the content item; and display, by the client-side application, the history of the content item, the history including modification events including the history entry.

5. The non-transitory computer-readable medium of claim 1, storing computer-executable instructions which, when executed by the one or more processors, cause the one or more processors to:

detect, by the client-side application, the one or more first modifications made to the content item;

determine, by the client-side application, a summary of the one or more first modifications, wherein a history entry includes the summary of the one or more first modifications; and display, by the client-side application, an indication of which of the plurality of user accounts has the exclusive editing permission of the content item.

6. The non-transitory computer-readable medium of claim 1, storing computer-executable instructions which, when executed by the one or more processors, cause the one or more processors to:

modify, by the first user account, the local version of the content item stored at the client device to yield a local modified version of the content item, wherein the local version of the content item is modified while a second user account has the exclusive editing permission;

send, by the client device and to the content management system, a request to synchronize the local modified version of the content item with the remote version of the content item and the other local versions of the content item stored on the other client devices;

receive, by the client device and from the content management system, an indication that the request to synchronize the local modified version of the content item has been rejected because the second user account has the exclusive editing permission; and store a copy of both the local modified version of the content item and the local version of the content item on the client device.

7. The non-transitory computer-readable medium of claim 1, storing computer-executable instructions which, when executed by the one or more processors, cause the one or more processors to:

receive, by the client device, a user input in the content item control interface, the user input claiming the exclusive editing permission for the content item;

receive, by the client device, the one or more first modifications to the local version of the content item stored at the client device; and synchronize the one or more first modifications to the local version of the content item stored on the client device with the remote version of the content item stored on the content management system and the other local versions of the content item to yield a synchronized copy of the content item stored at each of the client device, the other client devices, and the content management system.

8. A system comprising:

one or more processors; and at least one computer-readable medium storing computer-readable instructions that, when executed by the one or more processors, cause the one or more processors to:

receive, within a content item explorer interface, a user input from a first user account to open a local version of a content item in a native application;

cause display, by a client-side application on a client device associated with the first user account, of a content item control interface, the content item control interface displayed alongside the native application displaying the local version of the content item, wherein the client-side application synchronizes the local version with a remote version at a content management system, wherein the client-side application is a separate application from the native application, wherein the content item control interface is a window that displays metadata and controls dedicated to the content item displayed at the native application;

receive an indication, by the content item control interface of the client-side application, that the first user account has requested exclusive editing permission that is temporary to edit the content item;

determine, by the content item control interface, that the first user account made one or more first modifications to the local version of the content item at the native application; and synchronize, by the content item control interface, the one or more first modifications made to the local version of the content item with the remote version of the content item stored on the content management system and with other local versions of the content item stored on other client devices associated with a plurality of user accounts having access to the content item.

9. The system of claim 8, the at least one computer-readable medium storing computer-readable which, when executed by the one or more processors, cause the one or more processors to:

in response to a user input requesting to open the local version of the content item, provide a prompt asking whether to open the local version of the content item with the exclusive editing permission or without the exclusive editing permission;

based on a response to the prompt, send, by the client-side application to the content management system, a request from the first user account claiming the exclusive editing permission; and after an acceptance of the request claiming the exclusive editing permission, synchronize the one or more first modifications made to the local version of the content item with the remote version of the content item stored on the content management system and the other local versions of the content item stored on the other client devices.

10. The system of claim 8, the at least one computer-readable medium storing computer-readable which, when executed by the one or more processors, cause the one or more processors to:

receive a user input in the content item control interface effective to release the exclusive editing permission for the content item; and send, by the client-side application, a communication to the content management system, the communication indicating that the first user account has released the exclusive editing permission, whereby the content management system is configured to allow any of the plurality of user accounts having access to the content item to claim the exclusive editing permission of the content item.

11. The system of claim 8, the at least one computer-readable medium storing computer-readable which, when executed by the one or more processors, cause the one or more processors to:

send, by the client-side application, a history entry to the content management system for inclusion in a history of the content item; and display, by the client-side application, the history of the content item, the history including modification events including the history entry.

12. The system of claim 11, the at least one computer-readable medium storing computer-readable which, when executed by the one or more processors, cause the one or more processors to:

detect, by the client-side application, the one or more first modifications made to the content item;

determine, by the client-side application, a summary of the one or more first modifications, wherein the history entry includes the summary of the one or more first modifications; and display, by the client-side application, an indication of which of the plurality of user accounts has the exclusive editing permission of the content item.

13. The system of claim 8, the at least one computer-readable medium storing computer-readable which, when executed by the one or more processors, cause the one or more processors to:

modify, by the first user account, the local version of the content item stored at the client device to yield a local modified version of the content item, wherein the local version of the content item is modified while a second user account has the exclusive editing permission;

send, by the client device and to the content management system, a request to synchronize the local modified version of the content item with the remote version of the content item and the other local versions of the content item stored on the other client devices;

receive, by the client device and from the content management system, an indication that the request to synchronize the local modified version of the content item has been rejected because the second user account has the exclusive editing permission; and store a copy of both the local modified version of the content item and the local version of the content item on the client device.

14. The system of claim 8, the at least one computer-readable medium storing computer-readable which, when executed by the one or more processors, cause the one or more processors to:

receive, by the client device, a user input in the content item control interface, the user input claiming the exclusive editing permission for the content item;

receive, by the client device, the one or more first modifications to the local version of the content item stored at the client device; and synchronize the one or more first modifications to the local version of the content item stored on the client device with the remote version of the content item stored on the content management system and the other local versions of the content item stored on the other client devices to yield a synchronized copy of the content item stored at each of the client device, the content management system, and the other client devices.

15. A method comprising:

receiving, within a content item explorer interface, a user input from a first user account to open a local version of a content item in a native application;

causing display, by a client-side application on a client device associated with the first user account, of a content item control interface, the content item control interface displayed alongside the native application displaying the local version of the content item, wherein the client-side application synchronizes the local version with a remote version at a content management system, wherein the client-side application is a separate application from the native application, wherein the content item control interface is a window that displays metadata and controls dedicated to the content item displayed at the native application;

receive an indication, by the content item control interface of the client-side application, that the first user account has requested exclusive editing permission that is temporary to edit the content item;

determining, by the content item control interface, that the first user account made one or more first modifications to the local version of the content item at the native application; and synchronizing, by the content item control interface, the one or more first modifications made to the local version of the content item with the remote version of the content item stored on the content management system and with other local versions of the content item stored on other client devices associated with a plurality of user accounts having access to the content item.

16. The method of claim 15, further comprising:

receiving a user input in the content item control interface effective to claim the exclusive editing permission for the content item;

in response to a user input requesting to open the local version of the content item, presenting a first option to open the local version of the content item with the exclusive editing permission and a second option to open the local version of the content item without the exclusive editing permission;

based on an input selecting the first option, sending, by the client-side application to the content management system, a request for the first user account to claim the exclusive editing permission; and after an acceptance of the request claiming the exclusive editing permission, open the local version of the content item with the exclusive editing permission.

17. The method of claim 15, further comprising:

receiving a user input in the content item control interface, the user input releasing the exclusive editing permission for the content item; and sending, by the client-side application, a second communication to the content management system, the second communication indicating that the first user account has released the exclusive editing permission, whereby the content management system is configured to allow any of the plurality of user accounts having access to the content item to claim the exclusive editing permission of the content item.

18. The method of claim 15, further comprising:

receiving a request from the content management system, the request indicating that one other of the plurality of user accounts wishes to claim the exclusive editing permission;

displaying, in the content item control interface, a notification that the one other of the plurality of user accounts is requesting the exclusive editing permission;

receiving a user input in the content item control interface effective to release the exclusive editing permission for the content item; and sending, by the client-side application, a first communication to the content management system indicating that the first user account has released the exclusive editing permission.

19. The method of claim 15, further comprising:

receiving, by the client device, a user input in the content item control interface, the user input claiming the exclusive editing permission for the content item;

receiving, by the client device, the one or more first modifications to the local version of the content item stored at the client device; and synchronizing the one or more first modifications to the local version of the content item stored on the client device with the remote version of the content item stored on the content management system and the other local versions of the content item stored on the other client devices to yield a synchronized copy of the content item stored at each of the client device, the content management system, and the other client devices.

20. The method of claim 15, further comprising:

displaying, by the client-side application, a history of the content item, the history including one or more first modification events;

detecting, by the client-side application, the one or more first modifications made to the content item; and determining, by the client-side application, a summary of the one or more first modifications, wherein the history includes a history entry including the summary of the one or more first modifications.

21. The non-transitory computer-readable medium of claim 1, storing computer-executable instructions which, when executed by the one or more processors, cause the one or more processors to:

allow the first user account to claim the exclusive editing permission to edit the content item from the content item control interface, wherein the allowance of the first user account to claim the exclusive editing permission to edit the content item includes removing a previous claim by a second user account based on a request to review the editing permissions by the content management system, the first user account having an authority to force the second user account to release the previous claim of the exclusive editing permission.

22. The non-transitory computer-readable medium of claim 1, storing computer-executable instructions which, when executed by the one or more processors, cause the one or more processors to:

cause display of a status update at the content item control interface and an action button, wherein the status update dynamically changes to reflect which one or more user accounts are presently viewing the content item at respective third-party applications, wherein the action button appears in response to a second user account having the exclusive editing permission and making one or more second modifications; and cause to refresh, by the client-side application and in response to activation of the action button, a presentation of an unsynchronized local version of the content item at the native application to reflect a synchronized local version of the content item.

23. The non-transitory computer-readable medium of claim 1, storing computer-executable instructions which, when executed by the one or more processors, cause the one or more processors to:

when a different content item is displayed at the native application, updating the displayed metadata and controls to a new set of displayed metadata and controls dedicated to the different content item.

* * * * *